(12) United States Patent
Tsubota et al.

(10) Patent No.: US 10,732,623 B2
(45) Date of Patent: Aug. 4, 2020

(54) REMOTELY OPERATED MOBILE ROBOT AND ROBOT CONTROL SYSTEM

(71) Applicant: FUJI XEROX CO., LTD., Tokyo (JP)

(72) Inventors: Hirokazu Tsubota, Kanagawa (JP); Kunitoshi Yamamoto, Kanagawa (JP); Tsutomu Ishii, Kanagawa (JP); Hideto Nomiyama, Kanagawa (JP); Hideki Fujimoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 339 days.

(21) Appl. No.: 15/786,146

(22) Filed: Oct. 17, 2017

(65) Prior Publication Data
US 2018/0373239 A1     Dec. 27, 2018

(30) Foreign Application Priority Data

Jun. 21, 2017    (JP) .................................. 2017-121135

(51) Int. Cl.
| | |
|---|---|
| *G05D 1/00* | (2006.01) |
| *G05D 1/02* | (2020.01) |
| *B25J 11/00* | (2006.01) |
| *G06F 3/01* | (2006.01) |

(52) U.S. Cl.
CPC .......... *G05D 1/0022* (2013.01); *B25J 11/008* (2013.01); *G05D 1/005* (2013.01); *G05D 1/0033* (2013.01); *G05D 1/0038* (2013.01); *G05D 1/0077* (2013.01); *G05D 1/0268* (2013.01); *G05D 2201/0211* (2013.01); *G06F 3/017* (2013.01)

(58) Field of Classification Search
CPC ..... G05D 1/0011–0027; G05D 1/0055; G05D 1/0077; G05D 1/0038; G05D 1/0033; G05D 1/005; G05D 2201/0211; G05D 2201/0206; B25J 11/008; B25J 11/009
See application file for complete search history.

(56) References Cited

U.S. PATENT DOCUMENTS

| | | | | |
|---|---|---|---|---|
| 5,521,817 | A | * | 5/1996 | Burdoin ............... G05D 1/0027 244/190 |
| 2017/0285633 | A1 | * | 10/2017 | Poornachandran .. G05D 1/0022 |
| 2018/0348764 | A1 | * | 12/2018 | Zhang .................. G05D 1/0088 |

FOREIGN PATENT DOCUMENTS

| | | |
|---|---|---|
| JP | 4059742 B2 | 3/2008 |
| JP | 5905031 B2 | 4/2016 |
| JP | 2016-181140 A | 10/2016 |
| WO | 2012/103525 A2 | 8/2012 |

\* cited by examiner

*Primary Examiner* — Spencer D Patton
(74) *Attorney, Agent, or Firm* — Oliff PLC

(57) ABSTRACT

A remotely operated mobile robot includes a movement controller, a notification unit, and a switching unit. The movement controller is configured to be remotely operated by a terminal device connected to the remotely operated mobile robot through a communication line so as to control movement of the remotely operated mobile robot. The notification unit is configured to notify a terminal device, other than the terminal device connected to the remotely operated mobile robot, of a request for operation of the remotely operated mobile robot, if a predetermined condition is satisfied. If the terminal device notified of the request for operation of the remotely operated mobile robot makes an operation demand, the switching unit switches to a state of the movement controller to a state in which the movement controller is operable by the terminal device that makes the operation demand.

12 Claims, 12 Drawing Sheets

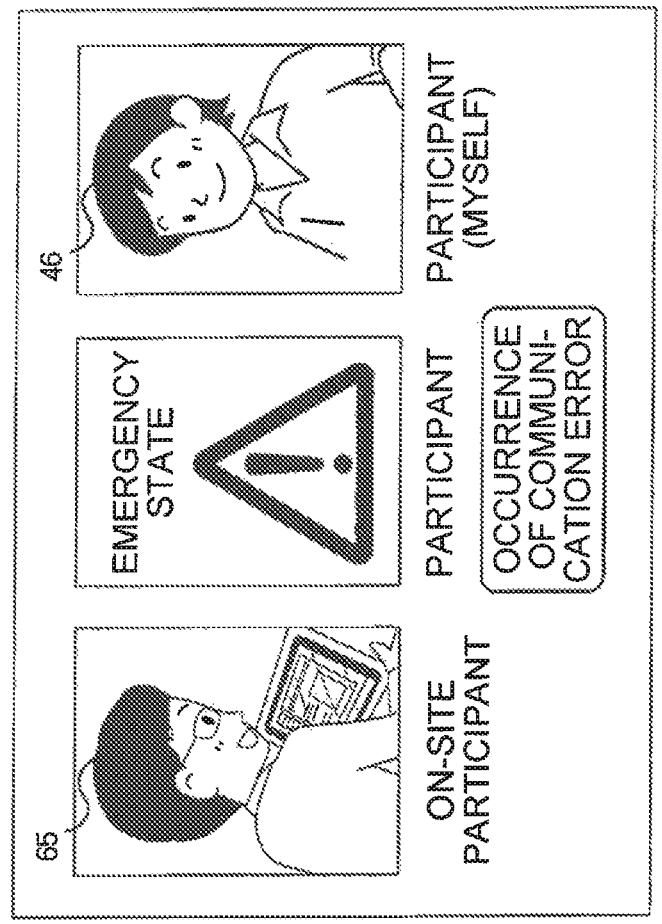
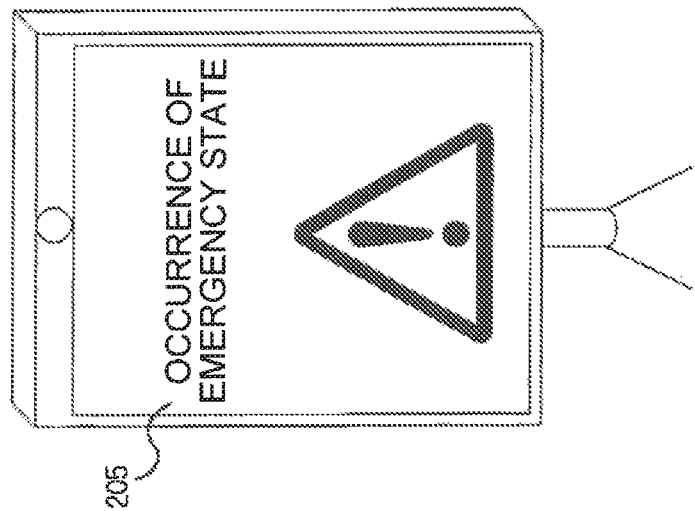

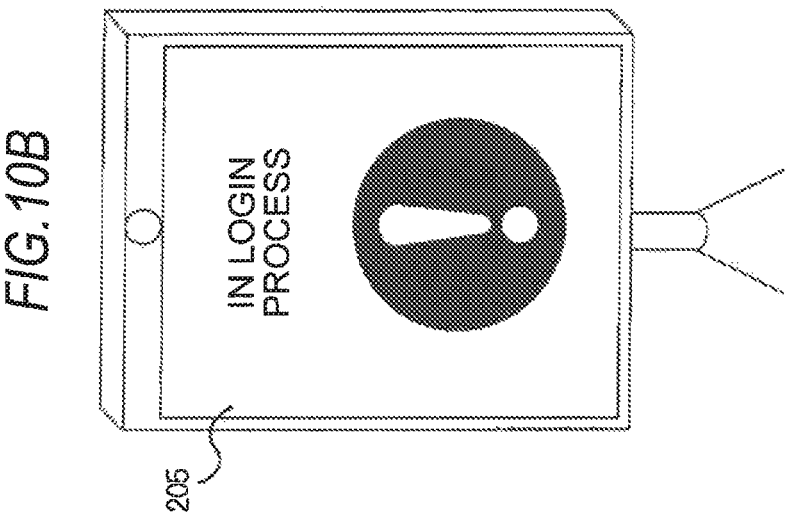
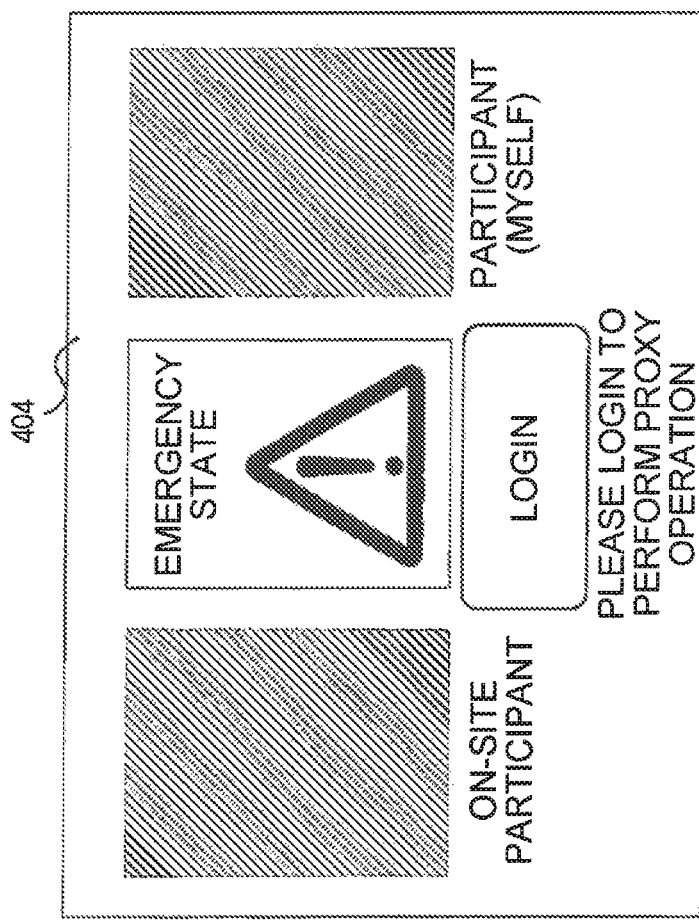

REMOTELY OPERATED MOBILE ROBOT AND ROBOT CONTROL SYSTEM

CROSS-REFERENCE TO RELATED APPLICATIONS

This application is based on and claims priority under 35 USC 119 from Japanese Patent Application No. 2017-121135 filed Jun. 21, 2017.

BACKGROUND

Technical Field

The present invention relates to a remotely operated mobile robot and a robot control system.

SUMMARY

According to an aspect of the invention, a remotely operated mobile robot includes a movement controller, a notification unit, and a switching unit. The movement controller is configured to be remotely operated by a terminal device connected to the remotely operated mobile robot through a communication line so as to control movement of the remotely operated mobile robot. The notification unit is configured to notify a terminal device, other than the terminal device connected to the remotely operated mobile robot, of a request for operation of the remotely operated mobile robot, if a predetermined condition is satisfied. If the terminal device notified of the request for operation of the remotely operated mobile robot makes an operation demand, the switching unit switches to a state of the movement controller to a state in which the movement controller is operable by the terminal device that makes the operation demand.

BRIEF DESCRIPTION OF THE DRAWINGS

Exemplary embodiments of the present invention will be described in detail based on the following figures, wherein:

FIG. 9A illustrates a state of a display device of the telepresence robot when an emergency state occurs;

FIG. 9B is a view illustrating a state of a display device of a remote operation terminal device that is remotely operating another telepresence robot when the emergency state occurs in the telepresence robot;

FIG. 10A is a view illustrating a state of the display device of the remote operation terminal device when the telepresence robot in the emergency state makes a login request to the remote operation terminal device that is remotely operating the other telepresence robot;

FIG. 10B is a view illustrating a state of the display device of the telepresence robot in the emergency state, during a login process;

DETAILED DESCRIPTION

Figure 1:
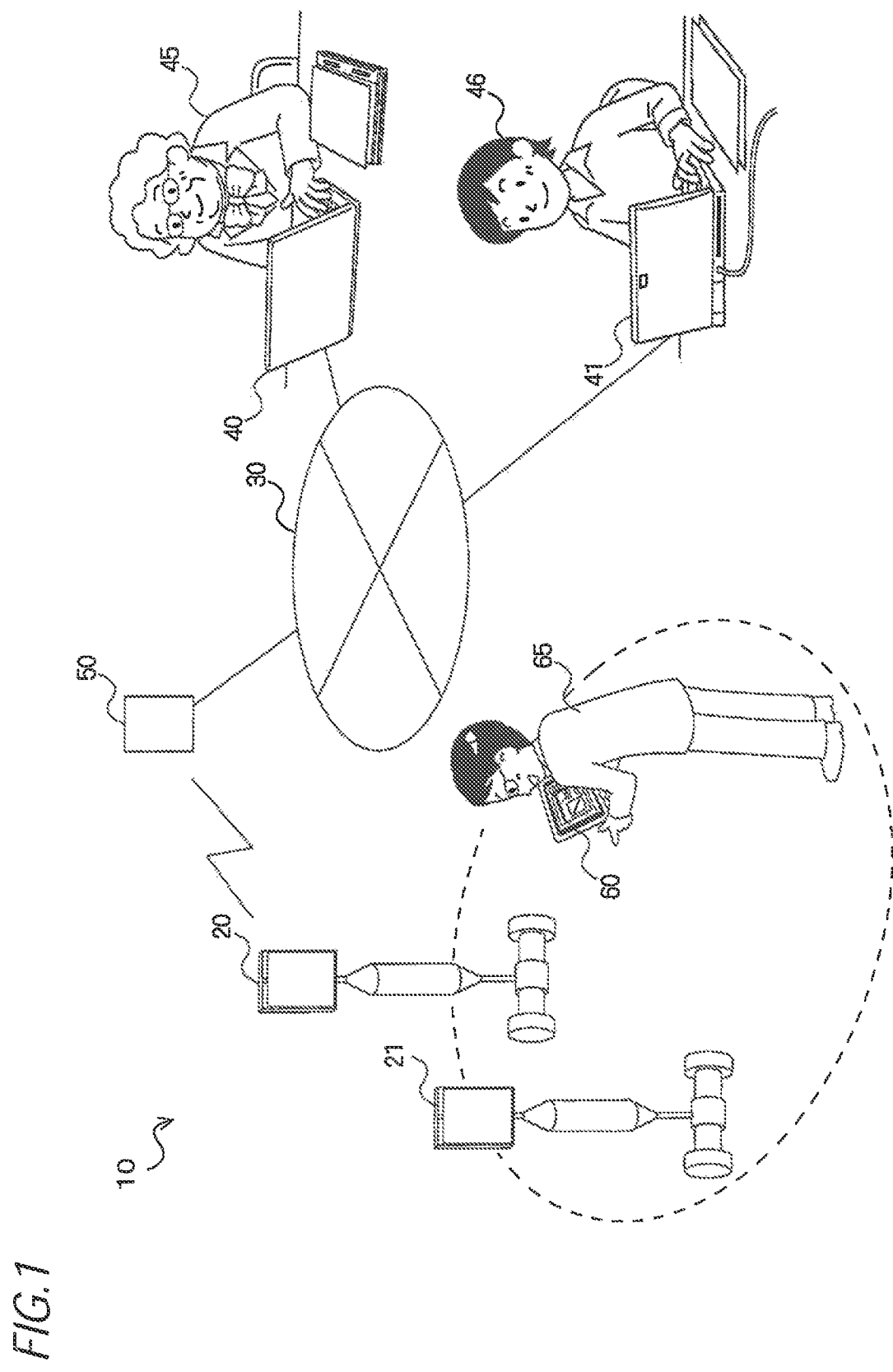
FIG. 1 is a schematic explanatory view illustrating an example of a robot control system according to an exemplary embodiment of the present invention, in which plural people remotely interaction with each other using a telepresence technology.

Exemplary embodiments of the present invention will be described in detail with reference to drawings. FIG. 1 is a schematic explanatory view illustrating an example of a robot control system 10 according to an exemplary embodiment of the present invention, in which plural people remotely interact with each other using a telepresence technology. As illustrated in FIG. 1, when the remote interaction is performed using the telepresence technology, at least one telepresence robot (two telepresence robots in the example of FIG. 1) 20 (21) is disposed at a site where the remote interaction is performed (hereinafter, referred to as a "site"). The telepresence robot 20, 21 are connected to remote operation terminal devices 40 and 41 located at remote areas far from the site via a network 30. A movement control of the telepresence robot 20, 21 is remotely controlled by the remote operation terminal device 40. The telepresence robots 20 and 21 are connected to the network 30 via an access point 50 disposed at the site. Further, there is an on-site participant 65 at the site, who interacts with the telepresence robots 20 and 21. The on-site participant 65 possesses a simple terminal device 60 wirelessly connected to the access point 50. In the example of FIG. 1, the telepresence robot 20 is remotely operated by a remote operator 45 who operates the remote operation terminal device 40, and the telepresence robot 21 is remotely operated by a remote operator 46 who operates the remote operation terminal device 41.

Figure 2:
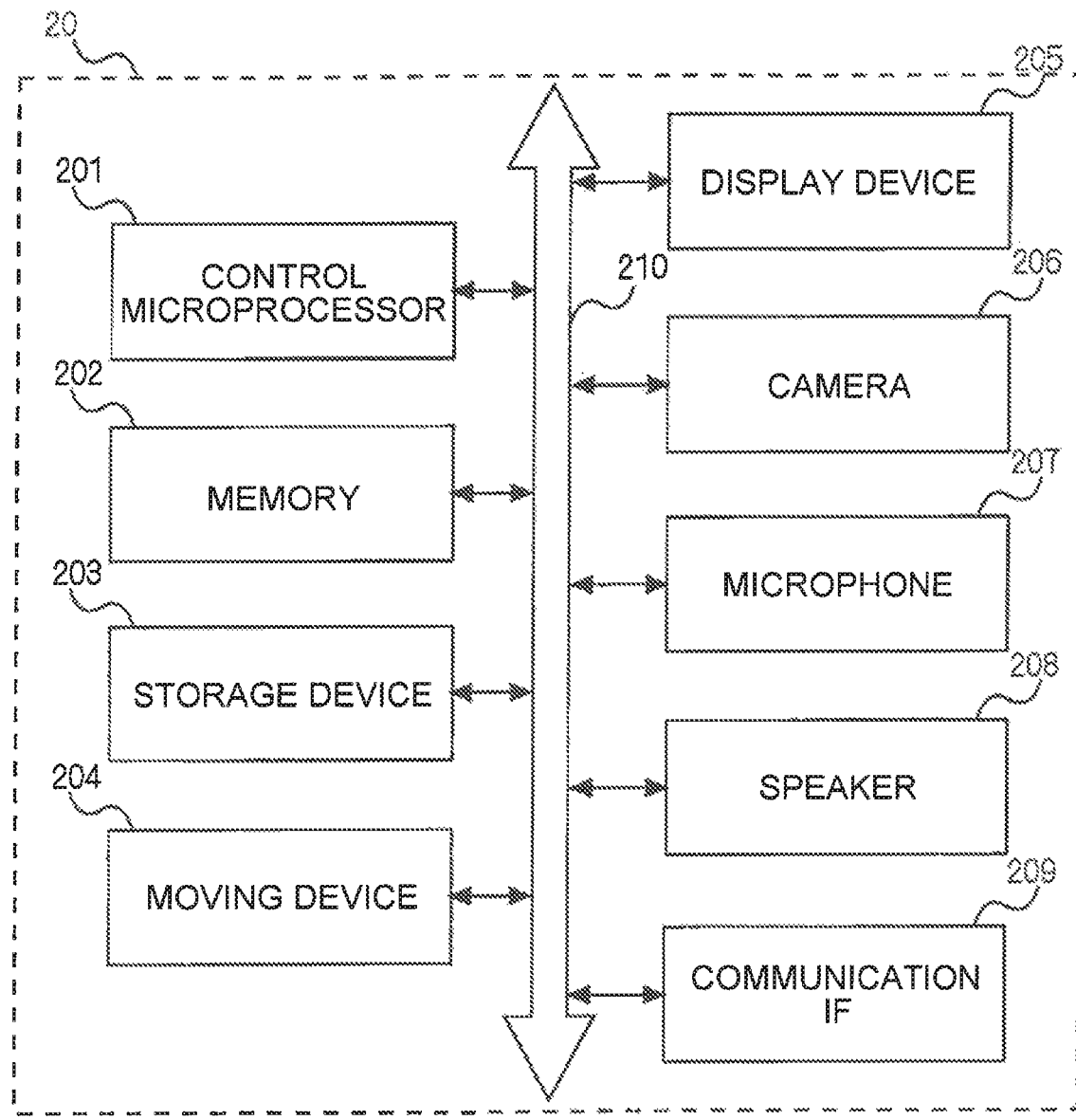
FIG. 2 is a hardware configuration view of a telepresence robot according to the exemplary embodiment of the present invention.

FIG. 2 is a hardware configuration view of the telepresence robot 20 according to the exemplary embodiment of the present invention. Since the telepresence robots 20 and 21 have the same hardware configuration and the same functional configuration, in the following description, only the telepresence robot 20 will be described, and descriptions on the telepresence robot 21 will be omitted. The telepresence robot 20, as illustrated in FIG. 2, includes a control microprocessor 201, a memory 202, a storage device 203, a moving device 204, a display device 205, a camera 206, a microphone 207, a speaker 208, and a communication interface 209 which are connected to a control bus 210.

The control microprocessor 201 controls operations of the respective units of the telepresence robot 20 based on a control program stored in the storage device 203.

The memory 202 temporarily stores movement control information and interaction control information received by the telepresence robot 20, an operation request candidate list, an image captured by the camera 206, a voice signal detected by the microphone 207, and the like.

The storage device 203 is configured with a hard disk (HDD) and a solid state drive (SSD), and stores the control program used for controlling respective units of the telepresence robot 20.

The moving device 204 includes tires, a motor, a transmission mechanism, a brake, a direction control device, a current position detection device, and a locking device that prevents an unintentional operation of the moving device in an emergency or the like (which are not illustrated). Movement of the moving device 204 is controlled by a movement controller which will be described later.

The display device 205 includes a display screen configured with a liquid crystal display provided at an upper portion of the telepresence robot 20. The display device 205 displays an image which is transmitted from the remote operation terminal device and which is provided by an interaction controller 222 which will be described later. The display device 205 also displays emergency notification information provided by a notification unit which will be described later. The display device 205 includes a status indicator lamp configured with a high-luminance LED lamp in addition to the display screen. The high-luminance LED lamp is turned on or blinks in an emergency to notify of an emergency state.

The camera 206 captures images of the on-site participant 65 on the site and surroundings on the site, and stores the images in the memory 202. The microphone 207 detects a voice of the on-site participant 65 and a surrounding voice of the site, and stores the detected voices in the memory 202. The speaker 208 outputs a voice of the remote operator 45 which is provided by the interaction controller 222 (which will be described later) of the telepresence robot 20. The speaker 208 also outputs a voice which indicates an emergency state and which is provided by the notification unit which will be described later. The communication interface 209 performs a communication control such that the telepresence robot 20 communicates with the remote operation terminal device and the simple terminal device 60 possessed by the on-site participant 65, via the access point 50.

Figure 3:
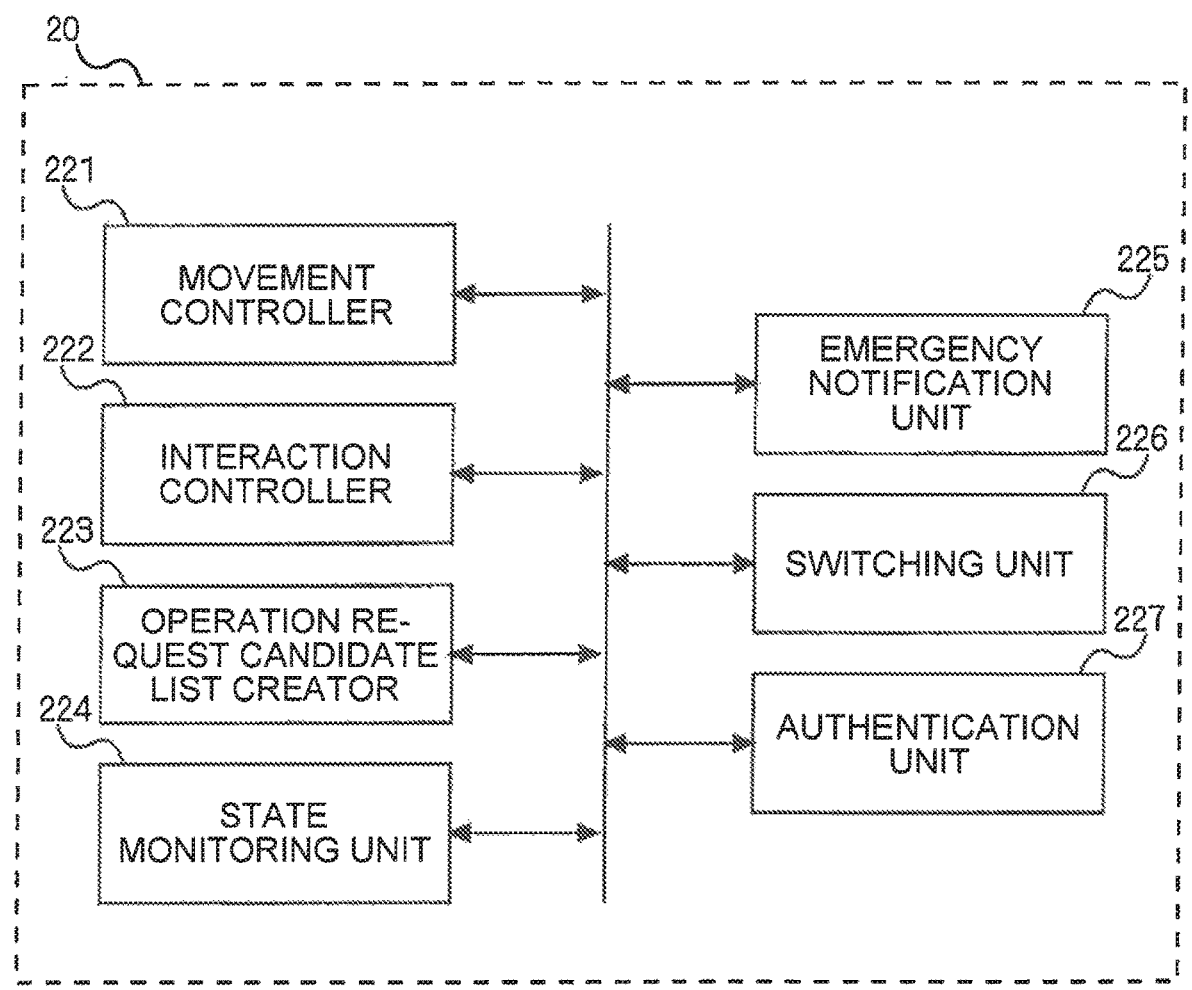
FIG. 3 is a functional block diagram of the telepresence robot according to the exemplary embodiment of the present invention.

FIG. 3 is a functional block diagram of the telepresence robot 20 according to the exemplary embodiment of the present invention. The telepresence robot 20 executes the control program stored in the storage device 203 by the control microprocessor 201 so as to serve as a movement controller 221, the interaction controller 222, an operation request candidate list creator 223, a state monitoring unit 224, an emergency notification unit 225, a switching unit 226, and an authentication unit 227 as illustrated in FIG. 3.

The movement controller 221 controls the moving device 204 based on remote operation information from the remote operation terminal device 40 to cause the telepresence robot 20 to move forward or backward, stop, or change in direction. The movement controller 221 activates locking of the locking device in an emergency or unlocks the locking of the locking device according to an instruction from the remote operation terminal device 41 or the simple terminal device 60. Further, if a login is made in an emergency from another remote operation terminal device 41 or the simple terminal device 60 which is notified of a request for operation of the telepresence robot 20 by the emergency notification unit 225 which will be described below, the movement controller 221 is remotely controlled by the remote operation terminal device 41 or the simple terminal device 60 which has performed the login. In an emergency, the movement controller 221 may control the moving device 204 such that the moving device 204 moves following the movement of the telepresence robot 21 which is not in an emergency state and which is operated by the other remote operation terminal device 41.

The interaction controller 222 performs a control such that video and voice received from the remote operation terminal device 40 are displayed on the display device 205 and reproduced by the speaker 208, and voice data received from the remote operation terminal device 40 is wirelessly transmitted to the simple terminal device 60 possessed by the on-site participant 65. Further, the interaction controller 222 performs a control so as to transmit, to the remote operation terminal device 40, (i) voices of the on-site participant 65 and voices around the telepresence robot 20 which are detected by the microphone 207 and (ii) images of the on-site participant 65 and video around the telepresence robot 20 which are captured by the camera 206.

The operation request candidate list creator 223 searches for (i) the on-site participant 65 participating in the remote interaction using the telepresence robot 20 and (ii) the remote operator 46 participating in the remote interaction using another telepresence robot (for example, the telepresence robot 21, hereinafter, described as the "telepresence robot 21"), creates a list as an operation request candidate list, and stores the list in the memory 202 or the storage device 203. Here, the operation request candidate list creator 223 requests the telepresence robot 21 and the simple terminal device 60 present in the vicinity to provide current positions, and creates an operation request candidate list indicating the other telepresence robot 21 and the simple terminal device 60 which are present at positions close to the telepresence robot 20 in order from the shortest distance, based on current position information included in a response to the request. Alternatively, the operation request candidate list creator 223 creates the operation request candidate list in order from the latest interaction history based on a history of interactions with the other telepresence robot 21 and the on-site participant 65, possessing the simple terminal device 60, who have made the interaction with the telepresence robot 20. The operation request candidate list may include terminal devices (not illustrated) possessed by an on-site support operator and a support specialized staff located at a remote place who support the remote interaction using the telepresence robot 20.

The state monitoring unit 224 monitors the state of the telepresence robot 20 and determines whether or not the state is an emergency state. For example, if a predetermined condition is satisfied, the state monitoring unit 224 determines that the state is the emergency state. Specifically, the state monitoring unit 224 monitors a communication situation between the telepresence robot 20 and the remote operation terminal device 40 that is remotely operating the telepresence robot 20. If the communication becomes impossible, if a communication failure occurs, or if a predetermined time has elapsed after the communication error has occurred, the state monitoring unit 224 determines that the state is the emergency state. Alternatively, the predetermined condition may include a case in which the telepresence robot 20 rides over an obstacle (for example, an umbrella placed on the ground) due to, for example, an erroneous operation.

If the state monitoring unit 224 determines that the telepresence robot 20 is in the emergency state, the emergency notification unit 225 notifies of the emergency state of the telepresence robot 20 through the display screen or the status indicator lamp of the display device 205, or the speaker 208. Specifically, the notification is made by displaying emergency notification information indicating the emergency state on the display screen of the display device 205, turning on or blinking the status indicator lamp, or announcing the emergency state via the speaker 208. On the display screen of the display device 205, a color of a screen display may be changed (for example, changed to a red screen display) so that the emergency state is easily recognized from the surroundings.

Further, the emergency notification unit 225 notifies a terminal device other than the remote operation terminal device 40 connected to an own device, of the emergency notification information and an emergency operation request. Specifically, the emergency notification unit 225 notifies the remote operation terminal device 41 that is remotely operating the other telepresence robot 21 other than the telepresence robot 20, of the emergency notification information and the emergency operation request. Also, the emergency notification unit 225 notifies the simple terminal device 60 possessed by the on-site participant 65 who is present in the vicinity of the telepresence robot 20, of the emergency notification information and the emergency operation request. The remote operation terminal device 41 and the simple terminal device 60 for which the notification of the emergency notification information or the emergency operation request is made may be sequentially selected in the order of priorities listed by the operation request candidate list creator 223.

If a login is made from the remote operation terminal device 41 or the simple terminal device 60 which is notified of the emergency operation request by the emergency notification unit 225 as described above and if the login is determined to be valid by the authentication unit 227 which will be described later, the switching unit 226 switches the state of the movement controller 221 of the telepresence robot 20 which is in the emergency state to a state in which the movement controller 221 is remotely operable by the remote operation terminal device 41 or the simple terminal device 60 that has performed the login.

If the remote operation terminal device 40 performs login to remotely operate the telepresence robot 20, the authentication unit 227 checks login information and determines whether the login is valid. Also, the authentication unit 227 authenticates the login from the remote operation terminal device 41 or the simple terminal device 60 in an emergency and determines whether the login is valid.

Next, descriptions will be made on the remote operation terminal device 40 that remotely operates the telepresence robot 20 with reference to FIGS. 4 and 5. The remote operation terminal device 41 that remotely operates the other telepresence robot 21 has the same hardware configuration and the same functional configuration as the remote operation terminal device 40, and thus descriptions thereof will be omitted.

Figure 4:
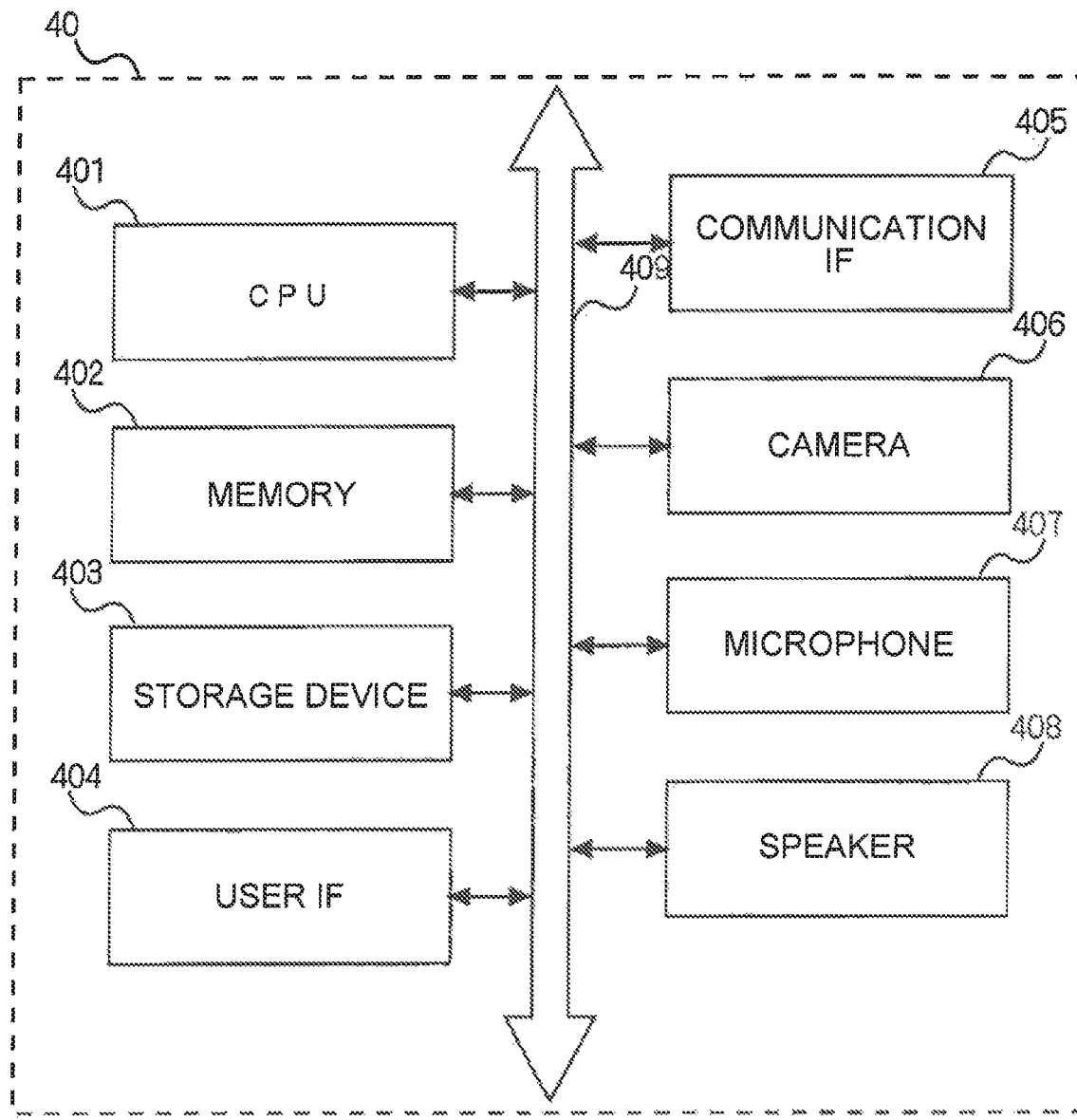
FIG. 4 is a view illustrating a hardware configuration of a remote operation terminal device according to the exemplary embodiment of the present invention.

FIG. 4 is a view illustrating a hardware configuration of the remote operation terminal device 40 according to the exemplary embodiment of the present invention. The remote operation terminal device 40 includes, as illustrated in FIG. 4, a CPU 401, a memory 402, a storage device 403, a user interface 404, a communication interface 405, a camera 406, a microphone 407, and a speaker 408 which are connected to a control bus 409.

The CPU 401 controls operations of the respective units of the remote operation terminal device 40 based on a control program stored in the storage device 403.

The memory 402 temporarily stores video and a voice received by the remote operation terminal device 40 from the telepresence robot 20, video captured by the camera 406 which will be described later, a voice signal detected by the microphone 407 and the like. Further, the memory 402 temporarily stores remote control information generated by a remote controller 422 which will be described later.

The storage device 403 is a storage device configured with a hard disk (HDD) or a solid state drive (SSD). The storage device 403 stores the control program for controlling the respective units of the remote operation terminal device 40 and an application program used for remotely operating the telepresence robot 20.

The user interface 404 includes a display device such as a liquid crystal monitor, and an input device such as a keyboard, a mouse, a joystick, or a touch pad. The display device displays images of the on-site participant 65 and surroundings thereof captured by the telepresence robot 20, images of the remote operator 46 and surroundings thereof captured by the other remote operation terminal device 41 that is remotely operating the other telepresence robot 21, and emergency notification information transmitted from another telepresence robot (for example, the telepresence robot 21) when the telepresence robot is in an emergency. The input device is used for inputting login information when login is made for the telepresence robot 20 remotely operated by the remote operation terminal device 40 and performing a remote operation to control the movement of the telepresence robot 20.

The communication interface 405 performs a communication control such that the remote operation terminal device 40 is connected to the telepresence robot 20 via the network 30 to perform a communication. If the remote operation terminal device 40 is a notebook personal computer or a tablet terminal, the camera 406 is, for example, a front camera. The camera 406 captures an image of the remote operator 45 who operates the remote operation terminal device 40 and surrounding thereof. The microphone 407 detects a voice of the remote operator 45 who operates the remote operation terminal device 40. The speaker 408 reproduces a voice of the interaction partner transmitted from the telepresence robot 20. The emergency notification information transmitted from the telepresence robot 21 other than the telepresence robot that is being remotely operated by the remote operation terminal device 40 is notified by a voice.

Figure 5:
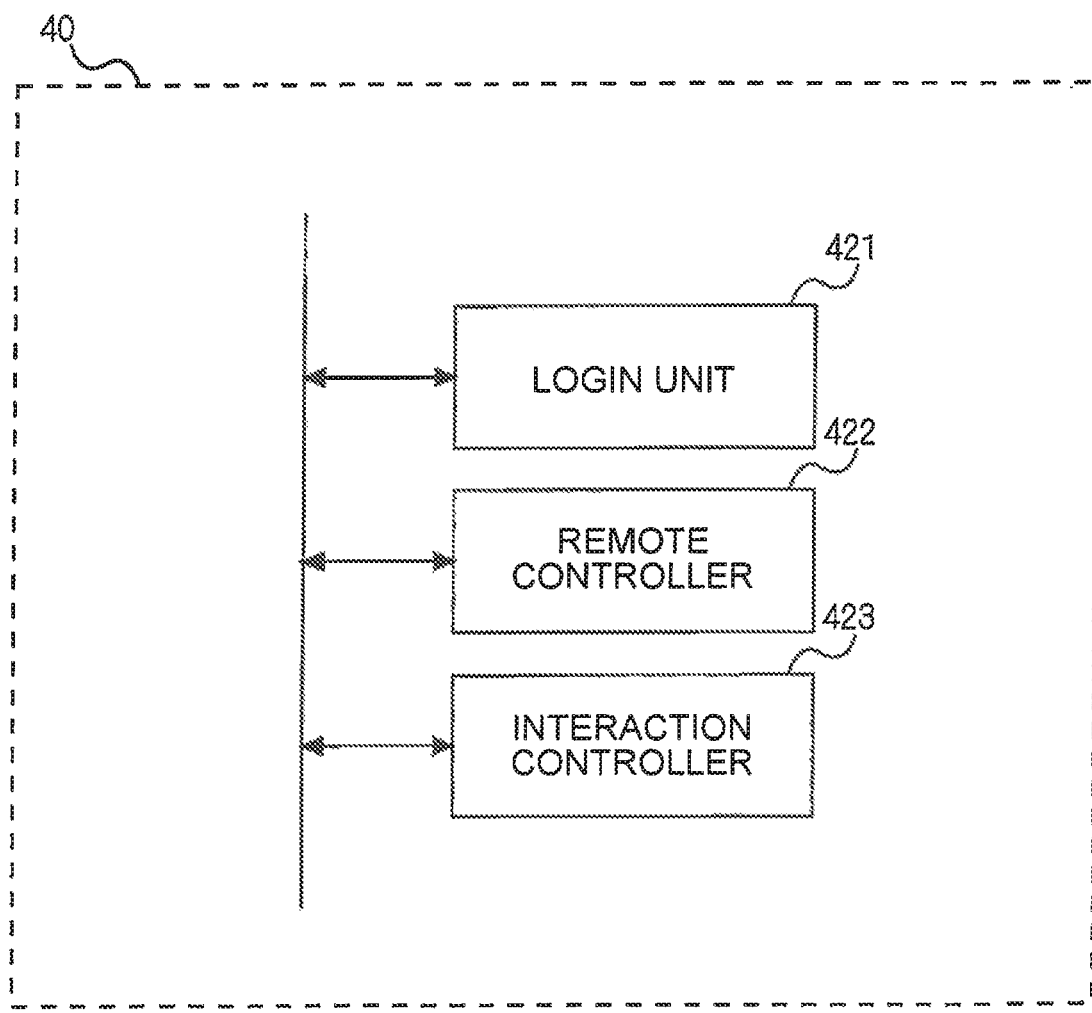
FIG. 5 is a functional block diagram of the remote operation terminal device according to the exemplary embodiment of the present invention.

FIG. 5 illustrates a functional block diagram of the remote operation terminal device 40 according to the exemplary embodiment of the present invention. As illustrated in FIG. 5, the remote operation terminal device 40 executes the application program stored in the storage device 403 so as to serve as a login unit 421, the remote controller 422, and an interaction controller 423.

The login unit 421 displays a login screen on the display device of the user interface 404, requests the remote operator 45 to input login information, and transmits the login information to the telepresence robot 20 when the login information is input by the input device of the user interface 404. If a telepresence robot (for example, the telepresence robot 21) other than the telepresence robot 20 normally remotely operated by the remote operation terminal device is in an emergency state, a screen of an emergency operation request transmitted from the telepresence robot is displayed on the display device.

The remote controller 422 controls movement of the telepresence robot 20 using the input device of the user interface 404. The remote controller 422 generates remote control information according to the operation of the input device by the remote operator 45, such as forward movement, backward movement, stop, and change in direction, and transmits the remote control information to the telepresence robot 20 via the network 30.

The interaction controller 423 transmits the video of the remote operator 45 captured by the camera 406 and the voice of the remote operator 45 detected by the microphone 407 to the telepresence robot 20. The interaction controller 423 also displays an image of the interaction partner received from the telepresence robot 20 on the display device and reproduces a voice of the interaction partner from the speaker 408.

Since the simple terminal device 60 possessed by the on-site participant 65 has substantially the same hardware configuration and the same functional configuration as the remote operation terminal device 40, detailed descriptions thereof will be omitted. The simple terminal device 60 and the remote operation terminal device 40 are different from each other in that the remote operation terminal device 40, at a normal time, remotely operates the telepresence robot 20, whereas the simple terminal device 60, at a normal time, is used for interacting with the telepresence robot 20. However, the simple terminal device 60 has a function of operating the telepresence robot 20 similarly to the remote operation terminal device 40 when the telepresence robot 20 is in an emergency. The remote operation terminal device 40 is a notebook personal computer placed at a remote place, while the simple terminal device 60 may be a tablet terminal device or a smartphone terminal device possessed by the on-site participant 65.

Figure 6:
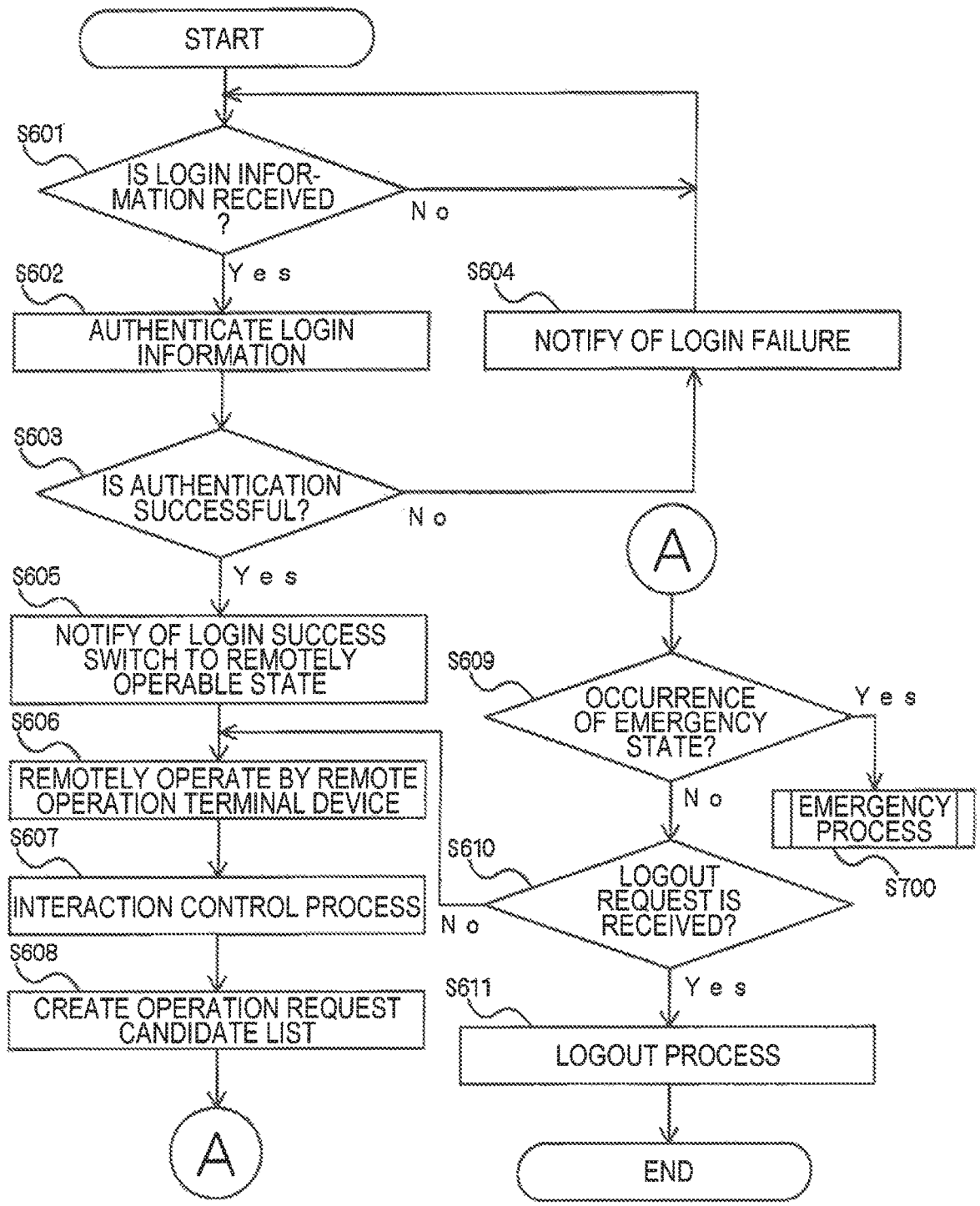
FIG. 6 is a flowchart illustrating a flow of an operation of the telepresence robot at a normal time according to the exemplary embodiment of the present invention.

Next, the flow of the operation of the robot control system 10 in the exemplary embodiment will be described with reference to FIGS. 6 to 8. FIG. 6 is a flowchart illustrating a flow of an operation of the telepresence robot 20 at a normal time. In step S601, the authentication unit 227 of the telepresence robot 20 determines whether login information has been received from the remote operation terminal device 40. If the login information has not been received, the authentication unit 227 waits as it is until login information is received. If the authentication unit 227 determines that the login information has been received from remote operation terminal device 40, the process proceeds to step S602, and the authentication unit 227 checks the received login information with authentication information stored in the storage device 203.

In step S603, if the received login information does not match the authentication information stored in the storage device 203, that is, if the authentication is failed, the process proceeds to step S604, a message indicating that login is failed is transmitted to the remote operation terminal device 40 which has transmitted the login information, and the process returns to step S601. In step S603, if the received login information matches the authentication information stored in the storage device 203, that is, if the authentication is successful, the process proceeds to step S605, a message indicating that login is successful is transmitted to the remote operation terminal device 40 which has transmitted the login information, and the switching unit 226 brings the movement controller 221 and the interaction controller 222 into a state in which the movement controller 221 and the interaction controller 222 are operable by the remote operation information and the interaction control information from the remote operation terminal device 40.

Next, in step S606, if receiving the remote operation information from the remote operation terminal device 40, the movement controller 221 controls the movement of the moving device 204 according to the remote operation information to cause the telepresence robot 20 to move forward or backward, or stop, or change the direction of the telepresence robot 20. In step S607, when receiving the interaction control information including video and voices from the remote operation terminal device 40, the interaction controller 222 performs a control to display the video on the display device 205, reproduce the voices by the speaker 208, or wirelessly transmit voice data received from the remote operation terminal device 40 to the simple terminal device 60 possessed by the on-site participant 65. Further, the interaction controller 222 transmits, to the remote operation terminal device 40, the voices of the on-site participant 65 and the voice data around the telepresence robot 20 which are detected by the microphone 207 of the telepresence robot 20, the voice data wirelessly transmitted from the simple terminal device 60 possessed by the on-site participant 65, and the images of the on-site participant 65 and the video around the telepresence robot 20 captured by the camera 206.

In step S608, the operation request candidate list creator 223 searches for a participant around the site who performs the remote interaction using the telepresence robot 20, and stores the participant in the operation request candidate list. Specifically, the operation request candidate list creator 223 requests the telepresence robot (for example, the telepresence robot 21) and the simple terminal device 60 which are present in the vicinity to provide current positions, and stores the telepresence robot 21 and the simple terminal device 60 in the vicinity as operation request candidates, in the operation request candidate list in order from the closest location from the telepresence robot 20 based on the current position information included in the response to the request. Alternatively, the operation request candidate list creator 223 stores operation request candidates in the operation request candidate list in order of an interaction history based on an interaction history of another telepresence robot (for example, the telepresence robot 21) that has interacted with the telepresence robot 20 and the on-site participant 65 possessing the simple terminal device 60 that has interacted with the telepresence robot 20. The operation request candidate list may include terminal devices (not illustrated) possessed by an on-site support operator and a support specialized staff located at a remote place who support the remote interaction using the telepresence robot 20.

In step S609, the state monitoring unit 224 determines whether an emergency state has occurred. Examples of the emergency state include a communication failure such as a communication impossibility and a communication error between the telepresence robot 20 and the remote operation terminal device 40 that is remotely operating the telepresence robot 20. The state monitoring unit 224 may determine that the emergency state has occurred whenever the communication failure occurs or may determine that the emergency state has occurred when the communication failure has continuously occurred for a predetermined time. If the state monitoring unit 224 determines that the telepresence robot 20 is in the emergency state, an emergency process S700 which will be described below is executed.

In step S609, if the state monitoring unit 224 determines that the telepresence robot 20 is not in the emergency state, the process proceeds to step S610, and the authentication unit 227 determines whether a logout request has been received from the remote operation terminal device 40. If the logout request has not been received, the process returns to step S606, and the remote operation by the remote operation terminal device 40 is continuously performed. If the authentication unit 227 determines that the logout request has been received, the process proceeds to step S611, and the authentication unit 227 transmits a message that a logout has been normally made to the remote operation terminal device 40, and the switching unit 226 switches the state of the movement controller 221 and the interaction controller 222 to a state in which the movement controller 221 and the interaction controller 222 are inoperable by the remote operation information and the interaction control information from the remote operation terminal device 40.

Figure 7:
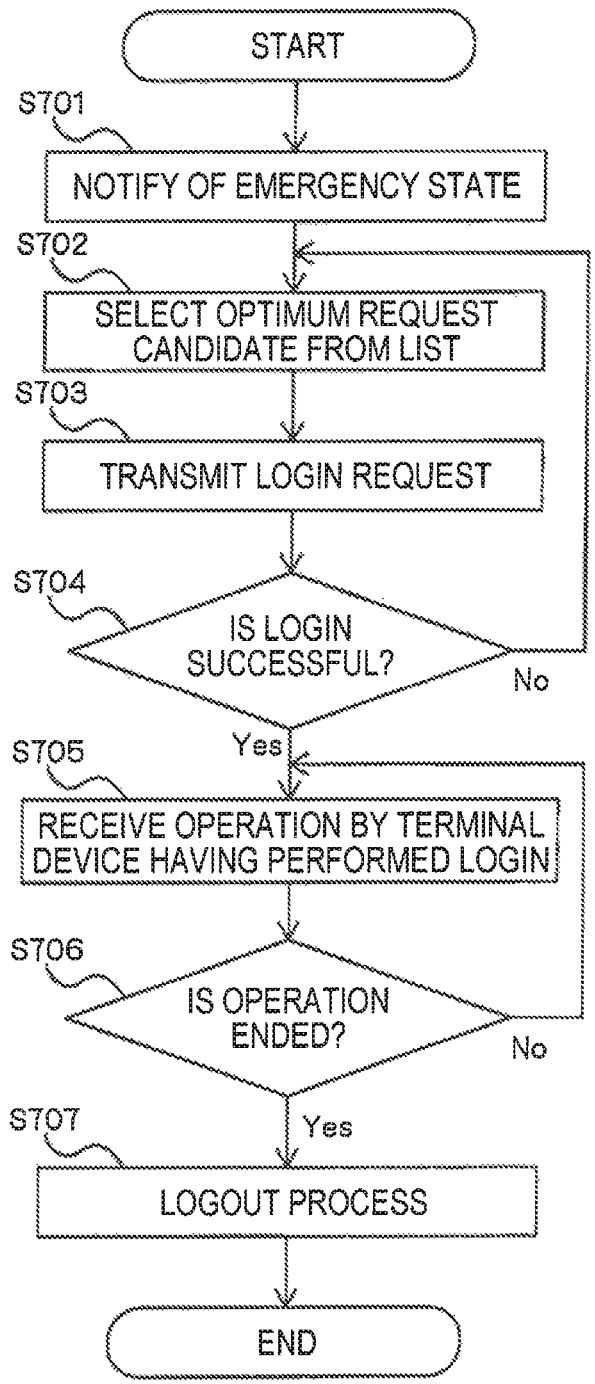
FIG. 7 is a flowchart illustrating a flow of an operation of the telepresence robot in an emergency process according to the exemplary embodiment of the present invention.
Figure 8:
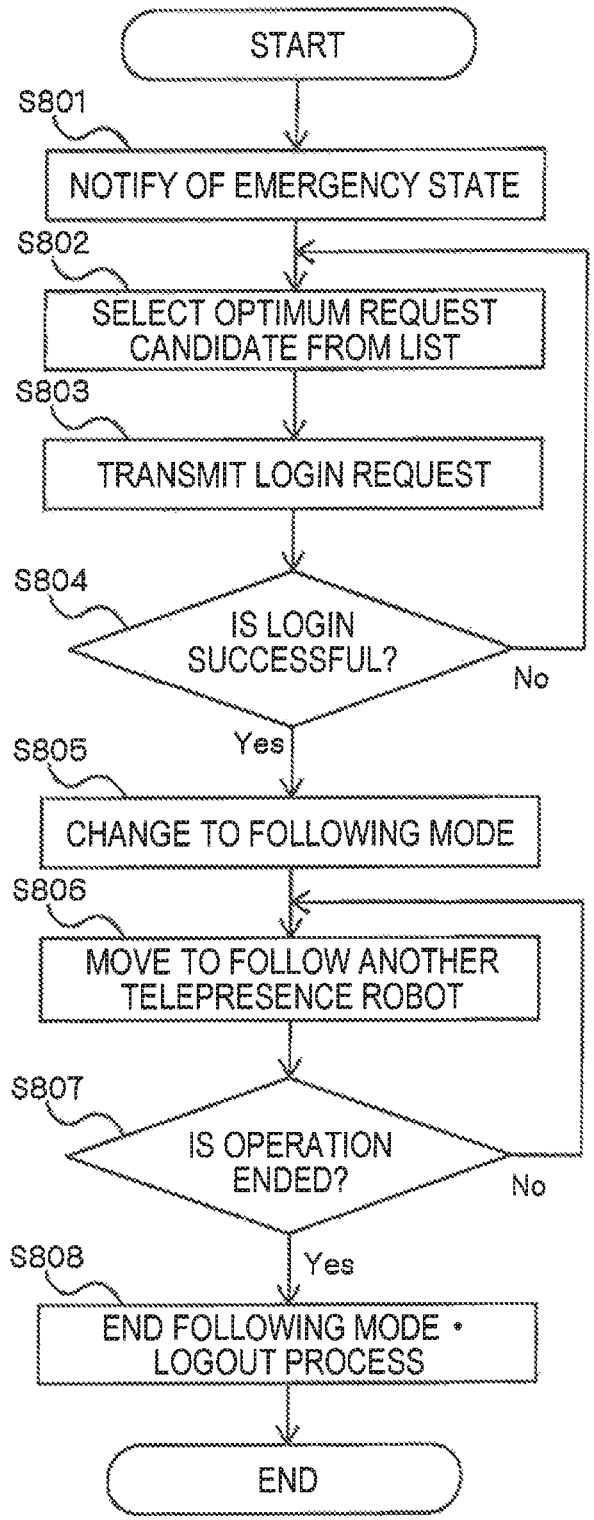
FIG. 8 is a flowchart illustrating an example of another operation of the telepresence robot in the emergency process in FIG. 6.

FIG. 7 is a flowchart illustrating an example of a flow of an operation of the telepresence robot 20 in the emergency process S700 in FIG. 6. In step S701, the movement controller 221 of the telepresence robot 20 locks a locking device provided in the moving device 204 to lock the movement of the telepresence robot 20. The emergency notification unit 225 of the telepresence robot 20 displays, on the display device 205, that the own device is in an emergency state. Specifically, the emergency notification unit 225 displays emergency notification information indicating an emergency situation on a display screen of the display device 205 or turns on or blinks the status indicator lamp. Also, the emergency notification unit 225 makes an announcement indicating that the own device is in the emergency state, through the speaker 208.

For example, FIG. 9A illustrates the display device 205 of the telepresence robot 20 when the emergency state occurs. The display device 205 displays a notification message "occurrence of emergency state" and a mark by which the emergency state is easily recognized. Here, although not illustrated in FIG. 9A, the display screen of the display device 205 may be blinked or the background may be displayed in a background color (for example, red) different from a normal color.

Further, in step S701 of FIG. 7, the emergency notification unit 225 notifies a remote operation terminal device (hereinafter, described as the "remote operation terminal device 41") that is remotely operating another telepresence robot (hereinafter, described as the "telepresence robot 21") and the simple terminal device 60 possessed by the on-site participant 65 which participate in the remote interaction and are included in the operation request candidate list created by the operation request candidate list creator 223, that the above described telepresence robot 20 is in the emergency state, and informs the remote operator 46 and the on-site participant 65 who are operating the remote operation terminal device 41 and the simple terminal device 60 of the emergency state through the user interface 404 of the remote operation terminal device 41 and the simple terminal device 60.

Here, FIG. 9B illustrates an example of an image displayed on the display device of the user interface 404 of the remote operation terminal device 41 that is remotely operating the telepresence robot 21. The display device displays an image of the on-site participant 65 captured by the telepresence robot 21, an image (the remote operator 45) captured by the camera 406 of the remote operation terminal device 40 that is remotely operating the telepresence robot 20, and an image (the remote operator 46) captured by the camera 406 of the own device (the remote operation terminal device 41). If an emergency situation occurs in the telepresence robot 20, as illustrated in FIG. 9B, instead of the image of the remote operator 45 who is remotely operating the telepresence robot 20, a message and a mark indicating the "emergency state" is displayed, and further, an explanatory text explaining the contents of the abnormality such as "occurrence of communication error" is displayed.

In step S702, the emergency notification unit 225 of the telepresence robot 20 in the emergency state selects one from among the operation request candidates included in the operation request candidate list created by the operation request candidate list creator 223. Subsequently, in step S703, a login request is made to the remote operation terminal device 41 which remotely operates the telepresence robot 21 or the simple terminal device 60 possessed by the on-site participant 65, as the selected operation request candidate.

For example, the emergency notification unit 225 makes a login request to the simple terminal device 60 possessed by the on-site participant 65, which has been an interaction partner of the telepresence robot 20 immediately before the occurrence of the emergency state, or the remote operation terminal device 41 remotely operating another telepresence robot 21, which has been an interaction partner of the telepresence robot 20 immediately before the occurrence of the emergency state. Alternatively, the emergency notification unit 225 makes the login request to (i) the simple terminal device 60 possessed by the on-site participant 65 present at a location physically closest to the telepresence robot 20 at a point of time of the occurrence of the emergency state or (ii) the remote operation terminal device 41 remotely operating the other telepresence robot 21 which is present at a location physically closest to the telepresence robot 20 at the point of time of the occurrence of the emergency state.

For example, FIG. 10A illustrates a state of a display device of the user interface 404 of the remote operation terminal device 41 when the telepresence robot 20 is making the login request to the remote operation terminal device 41 that is remotely operating another telepresence robot 21. In FIG. 10A, below the message and the mark indicating the emergency state in FIG. 9B, a "login" icon is displayed, and further, a message urging the login is displayed, and login of the remote operator 46 to the telepresence robot 20 is awaited.

In step S704 of FIG. 7, if login information is received from the remote operation terminal device 41 or the simple terminal device 60 to which the login request is made, the authentication unit 227 of the telepresence robot 20 in the emergency state authenticates the received login information. If the login is successful, the process proceeds to step S705. If the login information is not correct or has not been received within a predetermined time, the process returns to step S702. Among the operation request candidates included in the operation request candidate list, another remote operation terminal device 41 or another simple terminal device 60 is selected in a predetermined priority order, and is sequentially notified of the login request.

The login request is performed in the priority order listed in the operation request candidate list. Specifically, (i) the remote operation terminal device 41 that is remotely operating the telepresence robot 21 and that is present at the shortest physical distance from the telepresence robot 20 in the emergency state or (ii) the simple terminal device 60 possessed by the on-site participant 65 may be preferentially selected. Alternatively, (i) the remote operation terminal device 41 that remotely operates the telepresence robot 21 and that has recently performed an interaction or (ii) the simple terminal device 60 of the on-site participant 65 may be preferentially selected based on an interaction history of the telepresence robot 20 in the emergency state. The login request may be transmitted to all remote operation terminal devices 41 or all simple terminal devices 60 included in the operation request candidate list. Authentication may be performed in the order of reception of login information. Alternatively, if the login request is transmitted to all the remote operation terminal devices 41 and all the simple terminal devices 60 included in the operation request candidate list, the priorities in the operation request candidate list may be added in the notification. Then, the individual priorities may be displayed on the user interfaces 404 of the respective remote operation terminal devices 41 and the respective simple terminal devices 60.

During the login process of the telepresence robot 20, the authentication unit 227 may display on the display device 205 that the robot is performing the login process. In FIG. 10B, a message and a mark indicating that the own device is performing the login process are displayed on the display device 205 of the telepresence robot 20.

Figure 11:
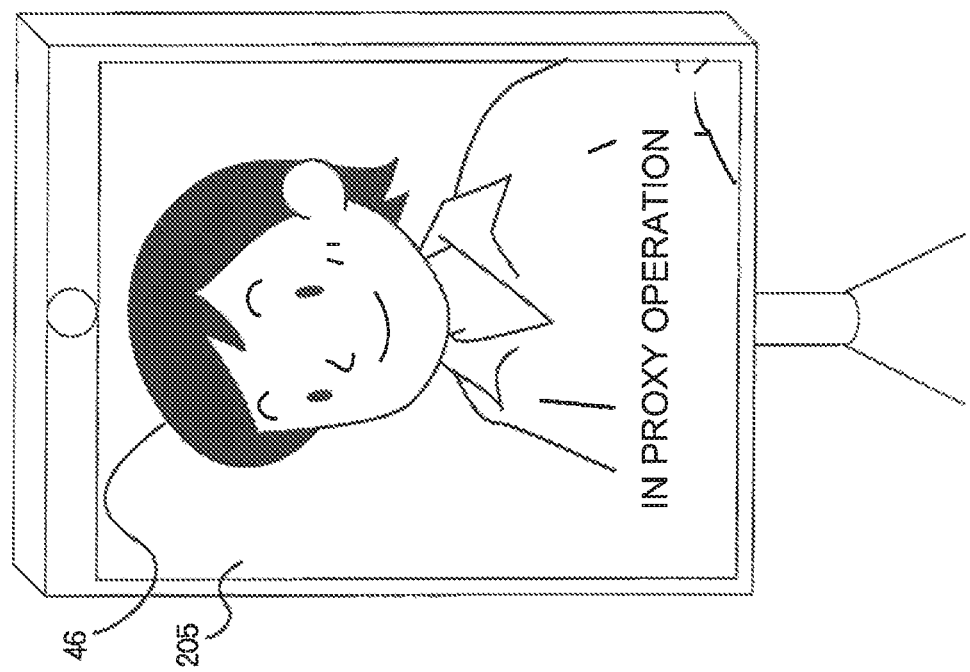
FIG. 11 is a view illustrating a state of the display device of the telepresence robot when the telepresence robot in the emergency state is operated by the remote operation terminal device by proxy.

In step S705 of FIG. 7, the switching unit 226 allows the remote operation terminal device 41 or the simple terminal device 60 which has succeeded in the login, to remotely operate the movement controller 221 of the telepresence robot 20 by proxy. The switching unit 226 displays that a proxy operation is being performed by another remote operation terminal device 41 or the simple terminal device 60 which has succeeded in login (hereinafter, collectively referred to as a "proxy terminal device 41 or 60"), on the display screen of the display device 205 of the telepresence robot 20. FIG. 11 illustrates the display device 205 of the telepresence robot 20 which displays a state where the proxy operation is being performed by the remote operation terminal device 41. In FIG. 11, the display device 205 displays an image of the remote operator 46 captured by the camera 406 of the remote operation terminal device 41 and a message indicating that the proxy operation is being performed.

An operator of the remote operation terminal device 41 which has succeeded in login or the simple terminal device 60 which has succeeded in login (hereinafter, collectively referred to as "proxy terminal device 41 or 60") operates the user interface 404 of the proxy terminal device 41 or 60. The movement controller 221 of the telepresence robot 20 in the emergency state unlocks the locking of the locking device of the moving device 204 based on the operation by the proxy terminal device 41 or 60 which has succeeded in login. Further, the operator operates the user interface 404 of the proxy terminal device 41 or 60 to perform an operation input such that the telepresence robot 20 in the emergency state is moved to a safe place through forward/backward movement, stop, or change in direction. The remote controller 422 of the proxy terminal device 41 or 60 generates remote control information correspondingly and transmits the remote control information to the telepresence robot 20 in the emergency state. When operating the simple terminal device 60, the operator may utter an instruction by a voice through the microphone 407 so that the remote controller 422 generates the remote control information.

When the telepresence robot 20 in the emergency state receives the remote control information, the movement controller 221 controls the moving device 204 of the telepresence robot 20 according to the received remote control information to move the telepresence robot 20 in the emergency state to, for example, a safe place. When a device which has performed login to the telepresence robot 20 in the emergency state is the remote operation terminal device 41, another telepresence robot 21 which has been remotely operated immediately before the occurrence of the emergency state is moved to a safe stand-by place prior to an proxy operation on the telepresence robot 20 in the emergency state. Then, the proxy operation may be made on the telepresence robot 20 in the emergency state.

In step S706 of FIG. 7, the state monitoring unit 224 determines whether the proxy remote operation of the telepresence robot 20 in the emergency state by the proxy terminal device 41 or 60 has ended. For example, when the telepresence robot 20 in the emergency state is moved to a safe place, it may be determined that the proxy remote operation has ended. Alternatively, when control information indicating an operation end is generated in the proxy terminal device 41 or 60 and is received by the telepresence robot 20, it may be determined that the proxy remote operation by the proxy terminal device 41 or 60 has ended.

In step S707, the authentication unit 227 performs a logout process so that the proxy remote operation is not further performed on the movement controller 221 of the telepresence robot 20 by the proxy terminal device 41 or 60 which is performing the proxy remote operation. Then, this process is terminated.

Subsequently, descriptions will be made on another example of an operation of the telepresence robot 20 in the emergency state with reference to FIG. 8. FIG. 8 is a flowchart illustrating an example of the other operation of the telepresence robot 20 in the emergency process S700 in FIG. 6. The process from steps S801 to S804 is the same as that from steps S701 to S704 in FIG. 7, and thus descriptions thereof will be omitted. The example of FIG. 8 is applied to a case where login is performed from the remote operation terminal device 41 that is remotely operating the other telepresence robot 21 other than the telepresence robot 20 which is in the emergency state.

In step S805, the switching unit 226 changes an operation mode of the movement controller 221 so that the telepresence robot 20 moves following the telepresence robot 21 that is not in the emergency state and that is operated by the remote operation terminal device 41 having succeeded in login. In step S806, the remote operator 46 of the remote operation terminal device 41 that has succeeded in login performs, by using the user interface 404 of the remote operation terminal device 41, a remote operation on the telepresence robot 21 that is not in the emergency state and that has been remotely operated by the own terminal device prior to the occurrence of the emergency state such that the telepresence robot 21 is moved to a safe place through forward/backward movement, stop, or change in direction. The telepresence robot 20 in the emergency state captures the telepresence robot 21, which is moving to the safe place, by the camera 206 to detect the movement thereof. The movement controller 221 of the telepresence robot 20 in the emergency state controls the moving device 204 of the own device to follow the movement of the telepresence robot 21 which not in the emergency state, and moves the telepresence robot 20 to the safe place. Alternatively, the telepresence robot 20 in the emergency state may acquire control information through a robot-to-robot communication from the telepresence robot 21 which is not in the emergency state, and may control the moving device 204 of the own device to follow the movement of the telepresence robot 21 which is not in the emergency state.

Figure 12:
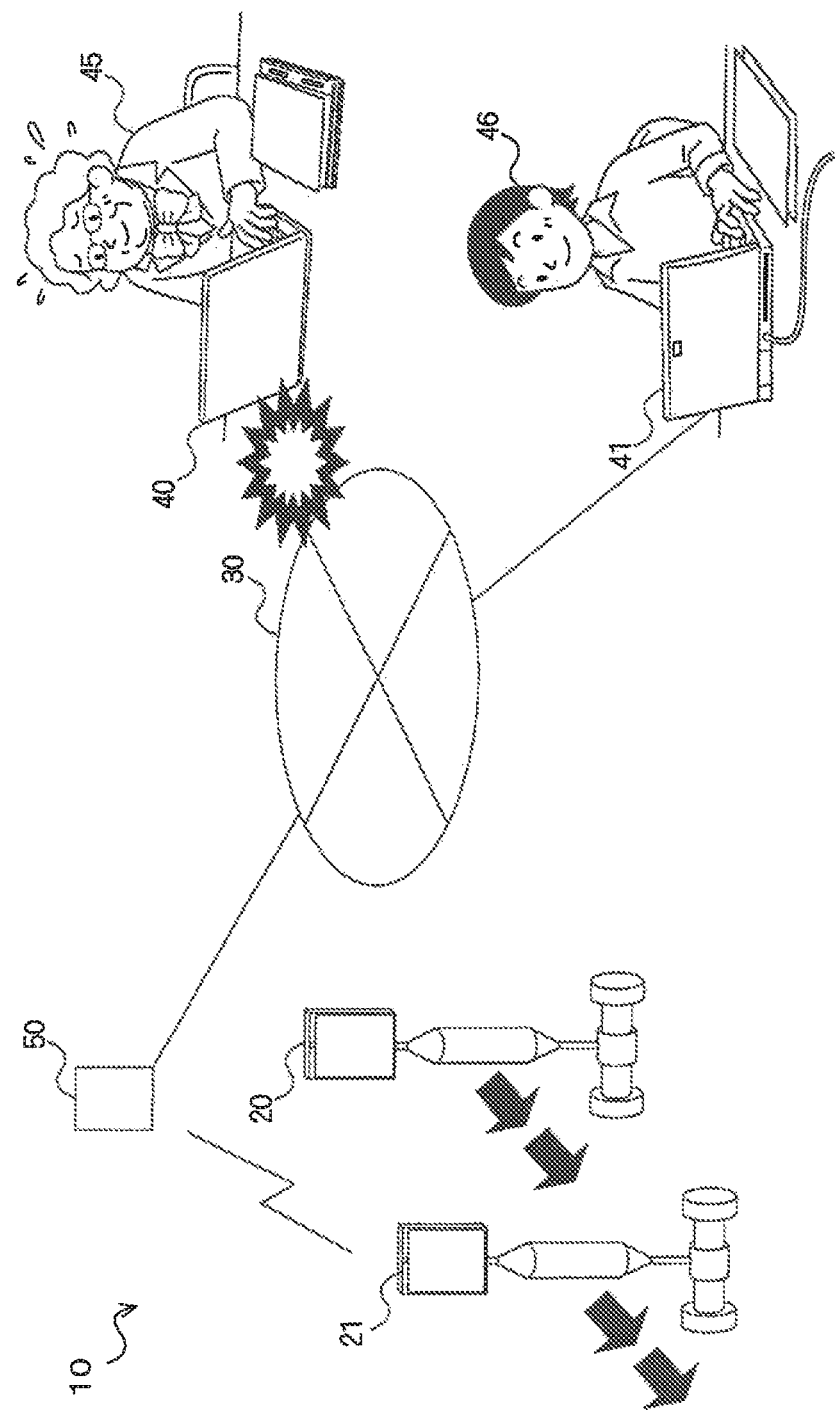
FIG. 12 is a view illustrating a state where the telepresence robot in the emergency state moves following the telepresence robot which is not in the emergency state.

FIG. 12 illustrates a state where the telepresence robot 20 in the emergency state moves following the telepresence robot 21 which is not in the emergency state. In FIG. 12, a communication failure occurs between the telepresence robot 20 and the remote operation terminal device 40 that is remotely operating the telepresence robot 20. It is impossible to perform the remote control. Therefore, the remote operation terminal device 41 remotely operating the telepresence robot 21 that is not in the emergency state remotely operates the telepresence robot 21. The telepresence robot 20 in the emergency state moves following the telepresence robot 21.

In step S807, the state monitoring unit 224 of the telepresence robot 20 in the emergency state determines whether the retreat operation of the telepresence robot 20 in the emergency state has ended. For example, if the telepresence robot 20 in the emergency state is moved to the safe place, it may be determined that the retreat operation has ended. Alternatively, if control information is generated indicating the end of the operation in the remote operation terminal device 41 that is remotely operating the telepresence robot 21 which is not in the emergency state and is transmitted to the telepresence robot 20 in the emergency state and if the telepresence robot 20 receives the control information indicating the end of the operation, it may be determined that the retreat operation has ended. If it is determined that the retreat operation has not ended, the process in step S806 is continuously performed.

In step S808, the switching unit 226 of the telepresence robot 20 in the emergency state ends the mode in which the telepresence robot 20 moves following the telepresence robot 21 which is not in the emergency state, and the authentication unit 227 of the telepresence robot 20 performs a logout process of the remote operation terminal device 41 that has remotely operated another telepresence robot 21. Then, the process ends.

In the above example, when the telepresence robot 20 is in the emergency state, the movement controller 221 of the telepresence robot 20 is operated by the proxy terminal device 41 or 60. However, there are cases where an operation by the proxy terminal device 41 or 60 is difficult or it is better for an on-site participant to operate the telepresence robot 20 in the emergency state. Therefore, when the emergency state occurs in the telepresence robot 20, the movement controller 221 of the telepresence robot 20 locks the locking device of the moving device 204, and the emergency notification unit 225 displays the emergency notification information indicating the emergency situation on the display screen of the display device 205, turns on or blinks the status indicator lamp, or makes the announcement indicating that the own device is in the emergency state through the speaker 208. At the same time, the operation of the on-site participant 65 in the vicinity is captured by the camera 206. If the on-site participant 65 stands in front of the camera 206 of the telepresence robot 20 and sequentially performs predetermined gestures (1) to (6), for example, (1) "raise a right hand," (2) "raise a left hand," (3) "lower a right hand," (4) "lower a left hand," (5) "raise both hands," (6) "lower both hands" or the like, the switching unit 226 switches the state of the movement controller 221 to a state in which the movement controller 221 is operable by gestures of the on-site participant 65 who has performed gestures.

Further, the movement controller 221 of the telepresence robot 20 is operated according to predetermined gestures by the on-site participant 65. Specifically, raising a right hand, raising a left hand, raising both hands, and lowering both hands by the on-site participant 65 correspond to "turn to the right," "turn to the left," "advance," and "stop," respectively.

Further, a two-dimensional code may be displayed on the casing of the telepresence robot 20, and may be scanned by the simple terminal device 60. Accordingly, even in the case where there is no login request from the telepresence robot 20, when the simple terminal device 60 which has scanned the two-dimensional code performs login to the telepresence robot 20, and the login is authenticated by the authentication unit 227, the movement controller 221 of the telepresence robot 20 may be operated by operating the user interface 404 of the simple terminal device 60 by proxy.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A remotely operated mobile robot comprising:
    a display screen; and
    a processor configured to:
        be remotely operated by a terminal device connected to the remotely operated mobile robot through a communication network so as to control movement of the remotely operated mobile robot;
        notify a terminal device, other than the terminal device connected to the remotely operated mobile robot, of a request for operation of the remotely operated mobile robot, if a predetermined condition is satisfied;
        control the display screen to display an indication that an emergency condition has occurred, if the predetermined condition is satisfied;
        control a brake to lock the remotely operated mobile robot if the predetermined condition is satisfied; and
        if the terminal device notified of the request for operation of the remotely operated mobile robot makes an operation demand, switch a state of the processor to a state in which the processor is operable by the terminal device that makes the operation demand.

2. The remotely operated mobile robot according to claim 1, wherein the processor is configured to notify a terminal device possessed by a user who is present around the remotely operated mobile robot, of the request for operation of the remotely operated mobile robot; and
    if the terminal device possessed by the user who is present around the remotely operated mobile robot and notified of the request for operation makes the operation demand, the processor is controlled by the terminal device possessed by the user who is present around the remotely operated mobile robot.

3. The remotely operated mobile robot according to claim 2, wherein the processor is configured to notify (i) a terminal device possessed by a user who is an interaction partner immediately before the predetermined condition is satisfied or (ii) a terminal device that remotely operates another remotely operated mobile robot, of the request for operation of the remotely operated mobile robot.

4. The remotely operated mobile robot according to claim 2, wherein the processor is configured to notify (i) a terminal device possessed by a user who is present at a physically closest location to the remotely operated mobile robot when the predetermined condition is satisfied or (ii) the terminal device that remotely operates another remotely operated mobile robot, of the request for operation of the remotely operated mobile robot.

5. The remotely operated mobile robot according to claim 1, wherein the processor is configured to notify a terminal device that is remotely operating another remotely operated mobile robot other than the remotely operated mobile robot, of the request for operation of the remotely operated mobile robot; and if the terminal device that is remotely operating another remotely operated mobile robot and notified of the request for operation makes the operation demand, the processor is controlled by the terminal device.

6. The remotely operated mobile robot according to claim 5, wherein the processor controls the remotely operated mobile robot to follow the other remotely operated mobile robot.

7. The remotely operated mobile robot according to claim 1, wherein the processor is configured to sequentially notify terminal devices other than the terminal device connected to the remotely operated mobile robot, of the request for operation of the remotely operated mobile robot in a predetermined priority order.

8. The remotely operated mobile robot according to claim 1, further comprising:

a camera configured to capture an image of surroundings;
  wherein if a predetermined gesture by a user is detected in the image captured by the camera, the processor is configured to switch the state of the processor to a state in which the processor is operable by the predetermined gesture by the user.

9. The remotely operated mobile robot according to claim 1, wherein the predetermined condition is satisfied if a communication failure occurs in the communication network between the remotely operated mobile robot and the terminal device that remotely operates the remotely operated mobile robot.

10. The remotely operated mobile robot according to claim 1, wherein the processor is configured to release the brake, based on an operation by the terminal device that has made the operation demand.

11. A robot control system comprising:

a remotely operated mobile robot; and
  a terminal device configured to remotely operate the remotely operated mobile robot through a communication network, wherein
  the remotely operate mobile robot includes a display screen, and a processor configured to:
    be remotely operated by the terminal device connected to the remotely operated mobile robot through the communication network so as to control movement of the remotely operated mobile robot;
    notify a terminal device, other than the terminal device connected to the remotely operated mobile robot, of a request for operation of the remotely operated mobile robot, if a predetermined condition is satisfied; and
    control the display screen to display an indication that an emergency condition has occurred, if the predetermined condition is satisfied;
    control a brake to lock the remotely operated mobile robot if the predetermined condition is satisfied; and
    if the terminal device notified of the request for operation of the remotely operated mobile robot makes an operation demand, switch a state of the processor to a state in which the processor is operable by the terminal device that makes the operation demand.

12. A remotely operated mobile robot comprising:

a display means for displaying images;
a control means for:
  being remotely operated by a terminal device connected to the remotely operated mobile robot through a communication network so as to control movement of the remotely operated mobile robot; and
  controlling a brake to lock the remotely operated mobile robot if a predetermined condition is satisfied;
a notifying means for:
  notifying a terminal device, other than the terminal device connected to the remotely operated mobile robot, of a request for operation of the remotely operated mobile robot, if the predetermined condition is satisfied; and
  controlling the display means to display an indication that an emergency condition has occurred, if the predetermined condition is satisfied; and
a switching means, wherein if the terminal device notified of the request for operation of the remotely operated mobile robot makes an operation demand, the switching means switches a state of the control means to a state in which the control means is operable by the terminal device that makes the operation demand.

\* \* \* \* \*